United States Patent
Livne et al.

(10) Patent No.: US 12,314,390 B2
(45) Date of Patent: May 27, 2025

(54) MALICIOUS VBA DETECTION USING GRAPH REPRESENTATION

(71) Applicant: Check Point Software Technologies Ltd., Tel Aviv (IL)

(72) Inventors: Dor Livne, Tel Aviv (IL); Avner Duchovni, Herzeliya (IL); Erez Israel, Tel Aviv (IL); Natan Katz, Tel Aviv (IL); Michael Abramzon, Ashkelon (IL)

(73) Assignee: Check Point Software Technologies Ltd., Tel Aviv (IL)

( * ) Notice: Subject to any disclaimer, the term of this patent is extended or adjusted under 35 U.S.C. 154(b) by 390 days.

(21) Appl. No.: 18/146,092

(22) Filed: Dec. 23, 2022

(65) Prior Publication Data

US 2024/0211596 A1  Jun. 27, 2024

(51) Int. Cl.
  *H04L 9/00* (2022.01)
  *G06F 21/56* (2013.01)
  *G06N 3/08* (2023.01)

(52) U.S. Cl.
  CPC ............. *G06F 21/563* (2013.01); *G06N 3/08* (2013.01)

(58) Field of Classification Search
  CPC ......... G06F 21/563; G06F 20/00; G06N 3/08; G06N 3/045
  See application file for complete search history.

(56) References Cited

U.S. PATENT DOCUMENTS

| | | | |
|---|---|---|---|
| 11,321,066 B2* | 5/2022 | Yu | G06N 5/022 |
| 2015/0370556 A1* | 12/2015 | Strosaker | G06F 8/75 |
| | | | 717/123 |
| 2021/0056211 A1* | 2/2021 | Olson | G06N 3/08 |
| 2022/0253691 A1* | 8/2022 | Rokka Chhetri | G06N 3/04 |

* cited by examiner

*Primary Examiner* — Syed M Ahsan

(74) *Attorney, Agent, or Firm* — Renner, Otto, Boisselle & Sklar, LLP

(57) ABSTRACT

A method and system are provided for detecting malicious code using graph neural networks. A call graph is created from the computer code by identifying functions in the computer code and vectorizing the identified functions using a stream of application programming interfaces (APIs) called by the functions and using tokens generated for the functions using a byte pair tokenizer. A trained graph neural network (GNN) and a trained attention neural network are applied to the call graph to generate an output graph with each node representing a function and each node assigned weights based on a probability distribution of the maliciousness of the corresponding function. A graph embedding is generated by calculating a weighted sum of the assigned weights and a trained deep neural network is applied to the graph embedding to generate a malicious score for the computer code identifying the computer code as malicious or benign.

20 Claims, 6 Drawing Sheets

| | Node 30a | Node 30b | Node 30c | Node 30d | Node 30e | Node 30f |
|---|---|---|---|---|---|---|
| Node 30a | | 1 | 5 | | | |
| Node 30b | | | | 2 | | |
| Node 30c | | | | | 6 | 4 |
| Node 30d | | | | | | |
| Node 30e | | | 7 | | | |
| Node 30f | | | | | | |

```
**********original function code**********

Function NNgu05XQ25lqj() As Long
Call v8YF3AirvQAtpCw@uhhjf
End Function

**********token sequence**********

['NN', 'gu', '0', 'X', 'X', 'Q', 'X', 'l', 'qj', 'V']
['Call', 'v', 'X', 'Y', 'F', 'X', 'Air', 'v', 'Q', 'At', 'p', 'C', 'w', 'X', 'u', 'hh', 'jf']
```

MALICIOUS VBA DETECTION USING GRAPH REPRESENTATION

TECHNICAL FIELD

The present disclosure relates generally to computer security and more particularly to detecting malicious code using machine learning.

SUMMARY

Macros are a fairly powerful, easy way to automate simple Microsoft Office tasks. Macros are embedded as a part of Office documents and previously were permitted to execute automatically when a document was opened. While designed to automate simple Microsoft Office tasks, the VBA (Visual Basic for Applications) programming language shares many of the same features as other programming languages. For example, VBA provides access to application and system events, objects, and operating system APIs.

In the late 1990's and early 2000's, including malicious VBA code in macros was frequently used by attackers to infect a computer. An attacker only needed a user to download and open an Office document to compromise a computer. Once a macro was running under the guise of an "official" Office document, the macro could infect files, download and install software, or take any other action to corrupt the system. Furthermore, because these actions were being performed as part of a macro, many anti-virus programs did not identify the macro as a threat. This simple infection vector was utilized by several prominent viruses at the time.

Microsoft began locking down macros in the mid 2000's and introduced the Antimalware Scan Interface (AMSI), which was able to scan the scripting functions being called at runtime by a macro. For this reason, many attackers moved on to seeking exploits (instead of macros) for infecting a computer. However, as exploits have become harder to find, macros have started making a comeback and current antivirus engines are not able to keep up with the number of new macros.

The present disclosure provides a method and system for detecting malicious code by applying graph neural networks to vector representations of each function found in computer code based on tokenizing of the malicious code, known application programming interfaces (APIs) found in the function, a measure of obfuscation of the computer code detected by tokenizing the functions, and detecting when a function is automatically called.

While a number of features are described herein with respect to embodiments of the invention; features described with respect to a given embodiment also may be employed in connection with other embodiments. The following description and the annexed drawings set forth certain illustrative embodiments of the invention. These embodiments are indicative, however, of but a few of the many ways in which the principles of the invention may be employed. Other objects, advantages, and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

Figure 1:
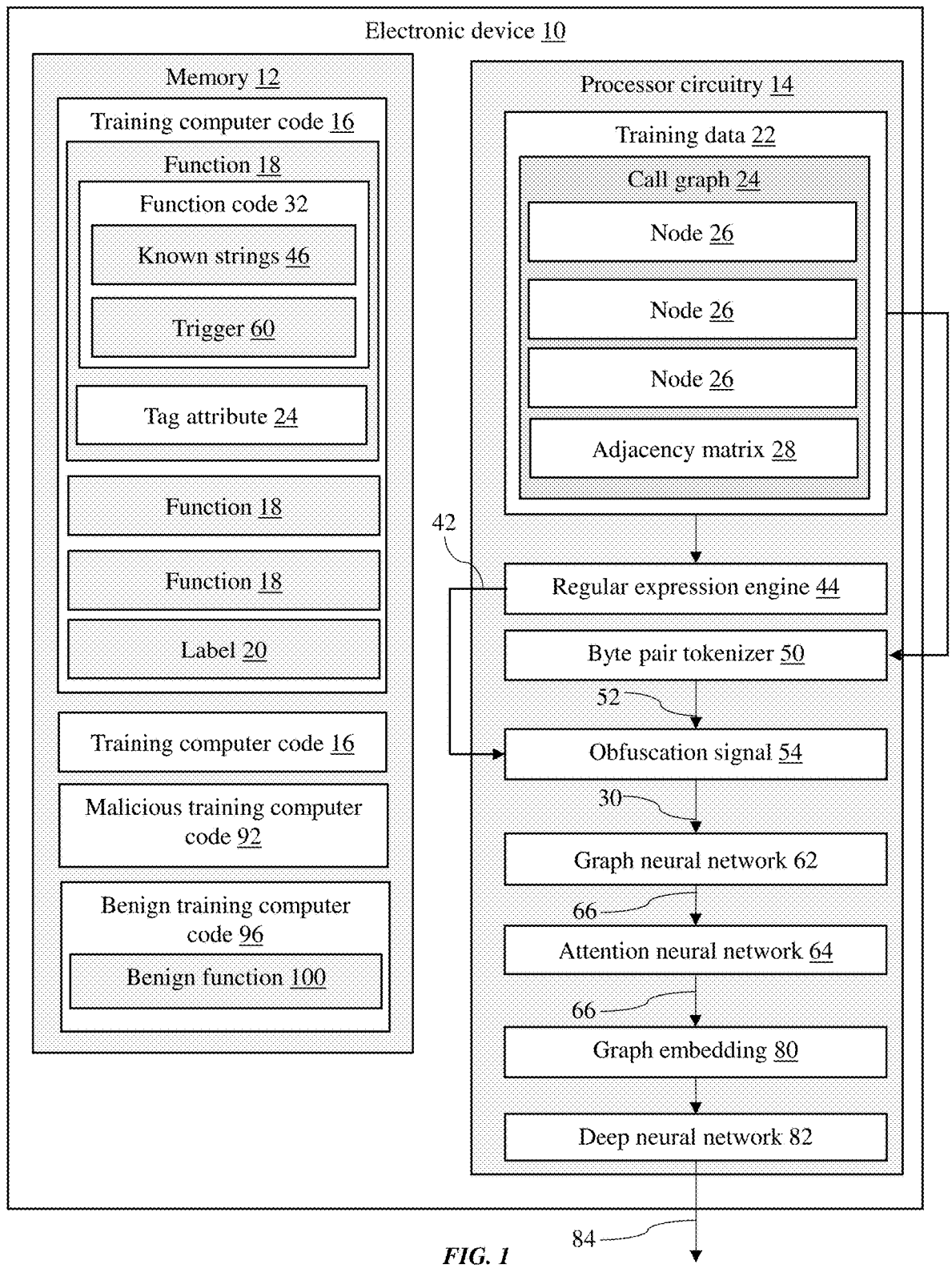
FIG. 1 is a block diagram of an embodiment of an electronic device for detecting malicious code using deep learning.

The present invention is described below in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

DETAILED DESCRIPTION

The present disclosure provides a method and system for detecting malicious code using graph neural networks. A call graph is created from the computer code by identifying functions in the computer code and vectorizing the identified functions using application programming interfaces (APIs) called by the functions and using tokens generated for the functions using a byte pair tokenizer. A trained graph neural network (GNN) and trained attention neural network are applied to the call graph to generate an output graph with each node representing a function and each node assigned weights based on a probability distribution of the maliciousness of the corresponding function. A graph embedding is generated by calculating a weighted sum of the assigned weights and a trained deep neural network is applied to the graph embedding to generate a malicious score for the computer code identifying the computer code as malicious or benign.

Malicious computer code (e.g., VBA macro based attacks) typically have four main indicators that can be extracted from the computer code: (1) auto-executable (e.g., once the user "enables macros"); (2) cause a file to be downloaded or inject code into a process; (3) if a payload was downloaded, the computer code executes the payload (e.g., immediately or scheduled at a later time to avoid detection); and (4) obfuscated code (e.g., to avoid detection by security tools). Computer code may be identified as malicious (or potentially malicious) if it is auto executable (meeting the first indicator) and meets one or more of the other indicators (i.e., 2, 3, or 4).

While attackers may attempt to obfuscate the code to avoid detection, the obfuscation technique is necessarily limited, because it cannot obfuscate the operating system's application programming interface (API) for the code to be successfully executed (e.g., auto-executed) by the operating system.

The present disclosure identifies malicious code by using a call graph structure of the computer code to classify the computer code as malicious or benign.

According to a general embodiment shown in in FIG. 1, an electronic device 10 is presented for detecting malicious code using deep learning. The electronic device 10 includes a memory 12 and processor circuitry 14. The memory 12 stores training computer code 16 including functions 18 and labeled 20 as malicious or benign. The processor circuitry 14 generates training data 22 by: (1) creating, from the stored training computer code 16, a call graph 24 having nodes 26 and an adjacency matrix 28; and (2) vectorizing each function 18 identified in the computer code 16 to form a fixed size feature vector 30 for each of the nodes 26. The processor circuitry 12 trains a graph neural network (GNN) 62 including an attention neural network 64 using the generated training data 22, such that when the GNN 62 is applied to the call graph 24, the GNN 62 aggregates neighboring nodes 26 in the call graph 24 and generates an output graph 66. The GNN 62 and attention neural network 64 may be trained offline. The attention neural network 64 modifies the output graph 66 by assigning weights 68 to nodes 70 of the output graph 66. The processor circuitry 14 generates a graph embedding 80 by calculating a weighted sum of the assigned weights 68.

The processor circuitry 14 also trains a deep neural network 82 to the graph embedding 80 to generate and output a malicious score 84 for the computer code 16 identifying the computer code 16 as malicious or benign.

Figures 2, 3:
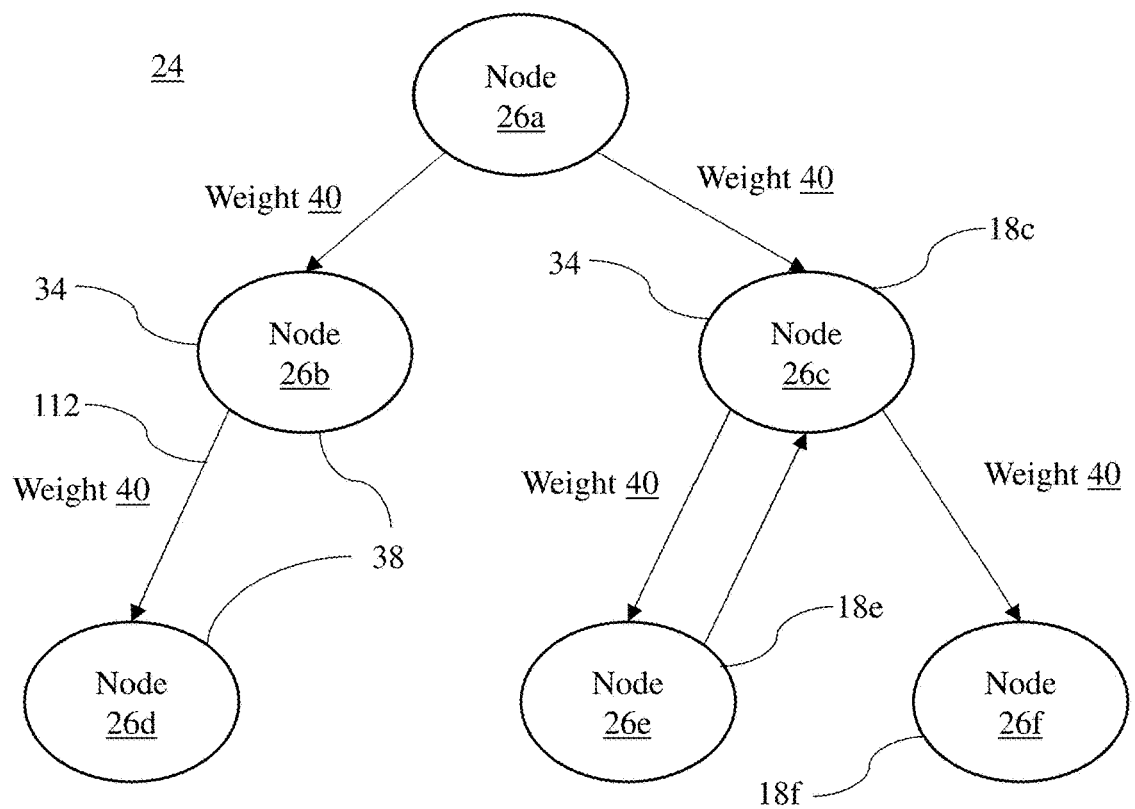
FIG. 2 is a block diagram of a call graph.
FIG. 3 is a diagram of an adjacency matrix for the call graph.

With exemplary reference to FIG. 2, the call graph 24 (also known as a call multigraph or a control-flow graph) represents calling relationships between functions 18 (also referred to as subroutines or procedures) in the computer code 16. Each node 26 represents a function 18 and each edge connecting two nodes indicates that one of the functions 18 calls the other function 18. For example, a cycle in the graph indicates recursive function calls (i.e., two functions calling one another). The call graph 24 may be generated in any suitable manner. For example, the computer code 16 may be VBA code from a VBA macro, and the call graph 24 may be generated using existing security tools for generating call graphs for analyzing malicious Microsoft Office macros (e.g., Vba2Graph found at http://github.com/MalwareCantFly/Vba2Graph). The computer code 16 may not be limited to VBA code, but may be applied to any suitable computer code 16. For example, the computer code 16 may be any human readable code where API's are called by name in the computer code 16 (i.e., such that the names of the called API's are readable from the code). In a preferred embodiment, the computer code is VBA code (e.g., from a macro).

The processor circuitry 14 additionally receives testing computer code 16 including functions 18. The processor circuitry 14 creates from the testing computer code 16 the call graph 24 having nodes 26 representing the functions 18, and the adjacency matrix 28. The processor circuitry 14 vectorizes each of the functions 18 identified in the testing computer code 16 to form a fixed size feature vector 30 for each of the nodes 26, and applies the trained GNN 62 (including the attention neural network 64) to the call graph 34 to generate the output graph 66 and to assign the weights 68 to the nodes 70 of the output graph 66.

A node embedding determines a fixed length vector representation for each node in a graph. The graph embedding determines a fixed length vector representation for the output graph (e.g., the graph 66 output by the attention neural network). This embedding is a lower dimensional representation of the graph and encodes the graph's topology. The processor circuitry 14 generates the graph embedding 80 (e.g., using a trained deep neural network) by calculating the weighted sum of the assigned weights 68 and applies the trained deep neural network 82 to the graph embedding 80 to generate and output a malicious score 84 for the received testing computer code 16 identifying the received testing computer code 16 as malicious or benign.

When generating the training data 22, the call graph 24 is created by identifying functions 18 by function code 32 located in the computer code 16. Each of the identified functions 18 represents the corresponding function code 32. For each of the identified functions 18, the function 18 is represented by a node 26 created in the call graph 24 and other functions of the computer code 16 called by the function 18 are identified as called functions 34. The adjacency matrix 28 of the call graph 24 is also determined.

With exemplary reference to FIG. 3, the adjacency matrix 28 is a matrix of elements 36 with each of the elements 36 representing two of the nodes 26 of the call graph 24 as a node pair 38. Each of the elements 36 has a weight 40 indicating whether the two nodes 26 of the node pair 38 (represented by the element 36) are connected. The two nodes 26 of the node pair 38 are connected when the function 18 represented by one of the nodes 26 of the node pair 38 calls the function 18 represented by the other node 26 of the node pair 38. The weight 40 of the element 36 is based on a number of calls between the two functions 18 represented by the two nodes 26 of the node pair 38.

As described above, each of the identified functions 18 is vectorized to form a fixed size feature vector 30 for each of the nodes 26. This vectorization of the nodes 26 may be referred to as node embedding. Each of the nodes 26 (representing the functions 18) are vectorized by generating a stream of APIs 42, tokenizing the function code 32 of the function 18 represented by the node 26, generating an obfuscation signal 54, and determining whether the function is automatically called. The stream of APIs 42, tokens generating from the function code 32, obfuscation signal, and function type (e.g., whether the function is automatically called) may all be included (or a representation of this information may be included) in the fixed size feature vector 30. For example, the stream of APIs 42, the generated tokens, obfuscation signal 54, etc. may each be encoded into fixed size vectors that are concatenated together and denoted as the node embedding (e.g., using a GRU). The feature vector 30 may also include additional information (e.g., a number of messages boxes generated by the function code 32).

Figures 8, 10:
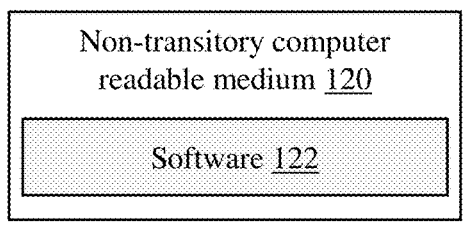
FIG. 8 depicts an exemplary tokenization of a function.
FIG. 10 is a block diagram of an embodiment of a non-transitory computer readable medium storing software for detecting malicious code using graph neural networks.

For each of the nodes 26, a stream of APIs 42 called by the function 18 (represented by the node 26) is generated by applying a regular expression engine 44 to identify known strings 46 representing known application programming interfaces (APIs). The function 18 (represented by the node 26) is also tokenized by applying a byte pair tokenizer 50 (also referred to as a byte pair encoding (BPE) tokenizer) to the function code 32 of the function 18, such that tokens 52 are generated representing the function 18. An exemplary tokenization of a function is shown in FIG. 8. An obfuscation signal 54 is generated based on both a length 56 of the generated tokens 52 and a length 58 of the function code 32. For example, the length 56 of the generated tokens may be divided by the length of the function code. A determination is made concerning whether the function 18 is automatically called by identifying one or more triggers 60 causing execution of the function 18 and determining whether the identified one or more triggers 60 is an auto-trigger based on properties of the trigger 60. When one of the identified one or more triggers 60 is an auto-trigger, the function 18 is identified as automatically called.

Figure 4:
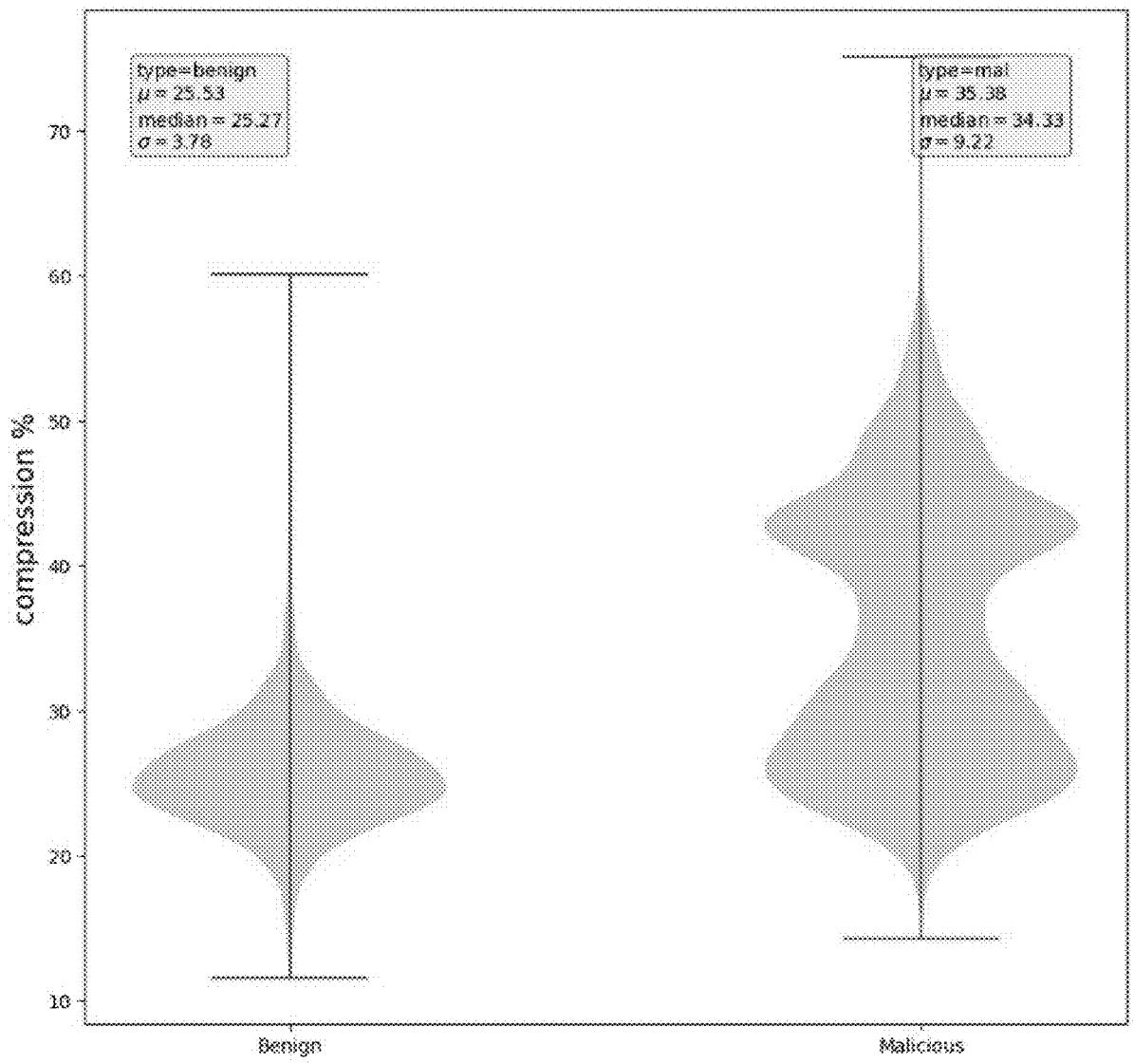
FIG. 4 depicts an exemplary compression of benign vs malicious code.

Tokenization is the process of representing raw text in smaller units called tokens. In particular, tokenization is the process of converting a sequence of characters into a sequence of tokens which further needs to be converted into a sequence of numerical vectors that can be processed by a neural network. The tokenization may be performed using any suitable algorithm or method. For example, the byte pair tokenizer 50 used to tokenize the function code 32 may act similar to Huffman compression. That is, obfuscated code may be harder to compress, because the byte pair tokenizer 50 may use word frequency in its merge rule, so that the byte pair tokenizer 50 is more inclined to merge sub-words of frequent words. As a result, obfuscated code will be comprised of long sequences of base vocabulary tokens. FIG. 4, shows an exemplary compression of benign and malicious code with the malicious code represented by base vocabulary tokens and longer sequences. For example, tokens that are most frequent in benign code may be more likely to include complete words, where tokens that are most frequent in malicious code may more likely include single characters.

Figure 5:
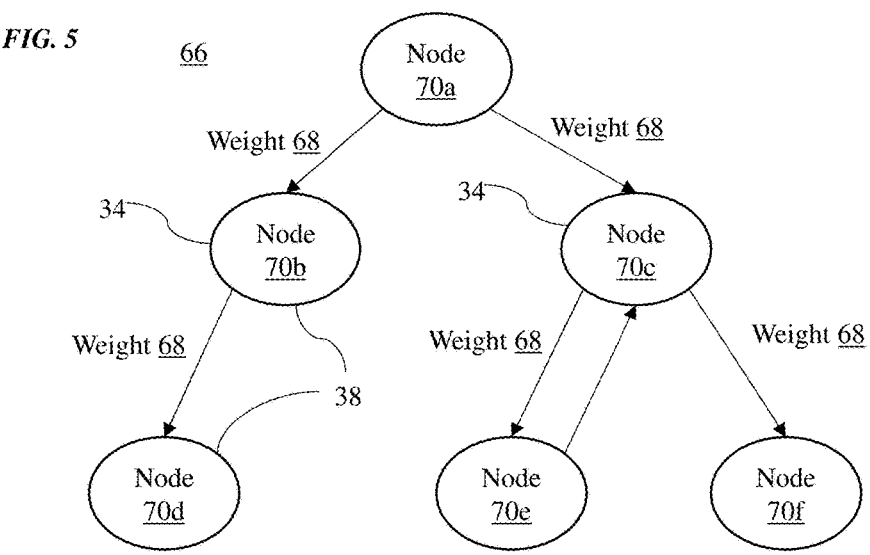
FIG. 5 is a block diagram of an output graph.

After each node is represented with a fixed size feature vector 30, the feature vectors may be aggregated using a graph neural network 62 with an attention neural network 64 (also referred to as an attention function) to emphasize malicious nodes for graph classification. As described above and with exemplary reference to FIG. 5, the attention neural network 64 modifies the output graph 66 by assigning weights 68 to nodes 70 of the output graph 66. Each of the nodes 70 of the output graph 66 corresponds to a node 26 of the call graph 24 representing a function 18 of the computer code 16, such that each of the nodes 70 of the output graph 66 represents a function 18 of the computer code 16. The weight 68 assigned to each of the nodes 70 is a probability distribution based on a determined maliciousness of the function 18 represented by the node 70 as determined by the attention neural network 64.

The attention neural network 64 may comprise two neural networks: a gate neural network and a tertiary neural network. The gate neural network may determine a score (also referred to as a scalar score) for each node. For example, the gate neural network may be fully connected and take each node and multiply each node to output a scalar from each node. Running this fully connected network over each node produces a scalar score for each node. The tertiary neural network further processes the node embedding. The scores determined by the gate neural network may be projected to a probability distribution using a softmax activation function. The softmax activation function converts a vector of K real numbers into a probability distribution of K possible outcomes. The output of the tertiary neural network may be summed based on the softmax output. The tertiary neural network may be a fully connected layer followed by a tanh activation, and the gate neural network may be a single fully connected layer.

The GNN 62 may be used to "digest" the structure of the call graph 40, including the connectivity (e.g., weights) between the functions 18. The GNN outputs the same graph structure (i.e., the structure of the output graph 66 may be the same as the structure of the call graph 40). For example, the graph structure information may be encoded in each node embedding. The malicious score 84 output by the GNN 62 may indicate a probability of the computer code 16 being malicious.

Figure 6:
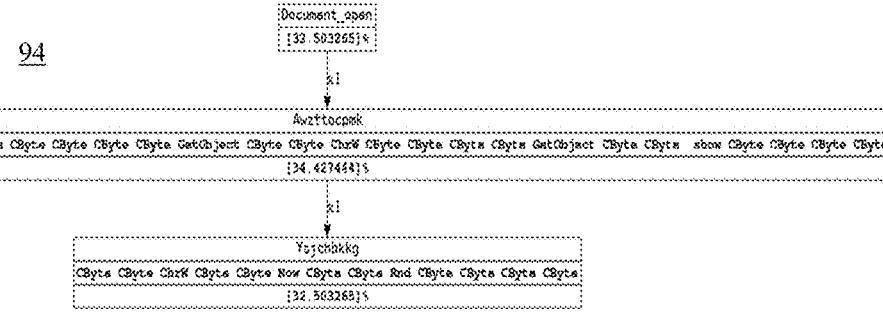
FIG. 6 depicts weights of an exemplary call graph.
Figure 7:
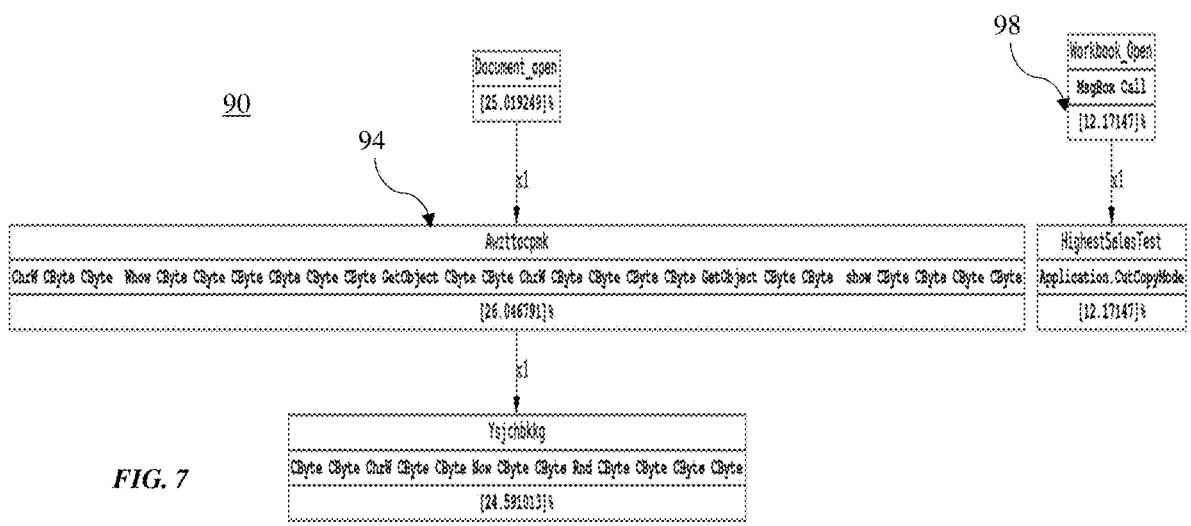
FIG. 7 depicts weights of the call graph of FIG. 6 with an added benign node.

The GNN 62 may act as a special kind of convolution that leverages graph structure. For example, as described above, the GNN 62 receives a list of nodes and the corresponding adjacency matrix and outputs a target. The GNN 62 architecture may utilize the structure of the call graph 24 through a mechanism referred to as message passing (similar to a convolutional layer where instead of aggregating spatial information, information is aggregated based on edges) to aggregate neighboring nodes. The nodes 26 of the call graph 24 are then flattened by the attention neural network 64 (also referred to as the attention layer) to the graph embedding (i.e., the output graph 66). The attention layer emphasizes functions 18 that most contributed to the discrimination of the call graph 24 as malicious or benign. For example, the attention neural network 64 may output a probability distribution over the nodes. The attention neural network 64 may learn (i.e., during training of the GNN 62) to avoid meaningless and disconnected nodes by assigning smaller weights to these nodes. For example, in FIG. 6 the weights of the call graph are roughly uniformly distributed, signifying that all functions contributed to the incrimination of this sample equally. Conversely, in FIG. 7, a benign node has been added to the call graph (as described in more detail below) and the weights of the call graph are substantially lower for the benign function (i.e., signifying that the benign function had less effect on the incrimination of the sample).

In one embodiment, the processor circuitry 14 is further configured to supplement the generated training data 22 to include obfuscated malicious training data 90 in the generated training data 22. For at least one of the stored training computer code 16 labeled as malicious, the processor circuitry 14 identifies the received training computer code 16 as malicious training computer code 92 and generates malicious training data 94 by: creating from the malicious training computer code 92 the call graph 24 having nodes 26 representing the functions 18 and the adjacency matrix 28, and vectorizing each of the functions 18 identified in the malicious training computer code 92 to form a fixed size feature vector 30 for each of the nodes 26. For at least one of the received training computer code 16 labeled as benign, the processor circuitry 14 identifies the received training computer code 16 as benign training computer code 96 and generates benign training data 98 by: creating from the benign training computer code 96 the call graph 24 having nodes 26 representing the functions 18 and the adjacency matrix 28, and vectorizing each of the functions 18 identified in the benign training computer code 96 to form a fixed size feature vector 30 for each of the nodes 26.

In this embodiment, for at least one of the functions 18 included in the benign training computer code 96, the processor circuitry 14 identifies the function 18 as a benign function 100, the node 26 representing the function 100 as a benign node, and the fixed size feature vector 30 for the node as a benign feature vector. With exemplary reference to FIGS. 6 and 7, the processor circuitry 14 generates obfuscated malicious training data 90 by adding the benign node to the call graph 24 of the malicious training data 94 and labels the generated obfuscated malicious training data 90 as malicious. The processor circuitry 14 also adds the generated obfuscated malicious training data 90 to the generated training data 22.

For each of the identified auto-trigger functions, the processor circuitry 14 may identify each of the functions 18 called by the auto-trigger as an auto-trigger function. For example, as shown in FIG. 2, if a parent function 18c is identified as an auto-trigger function, then all the functions called by the parent function 18c (i.e., child functions 18e, 18f) may also be identified as auto-trigger functions (e.g., because triggering of the parent function 18a may result in each of the child functions being automatically called). The processor circuitry 14 may determine a type of a function 18 (e.g., auto-triggered) based on a keyword included in a function name included in the code for the trigger of the function.

For each function 18, the processor circuitry 14 may pass the stream of APIs 42 to a bi-directional gated recurrent unit (GRU) and an output of the bi-directional GRU may be included in the fixed size feature vector for the function. Similarly, for each function 18, the processor circuitry 14 may pass the generated tokens 52 representing the function 18 to a bi-directional GRU and an output of the bi-directional GRU may be included in the fixed size feature vector 30 for the function 18. The GRU may have a sequence-to-one architecture. At least one of an order of appearance or identified keywords in the generated stream of APIs may be weighted as more important by the bi-directional GRU. Similarly, at least one of an order of appearance or identified keywords in the generated tokens 52 may be weighted as more important by the bi-directional GRU.

In the call graph 24, two connected nodes 26 may be connected by an edge 112 having a weight 40 based on a number of calls between the two functions 18 represented by the two connected nodes 26. For example, in FIG. 3, if function 18a (represented by node 30a) calls function 18c (represented by node 30c) five times, then the weight 40 of the edge 112 connecting function 18a and function 18c may correlated to the number of times the function is called.

Figure 9:
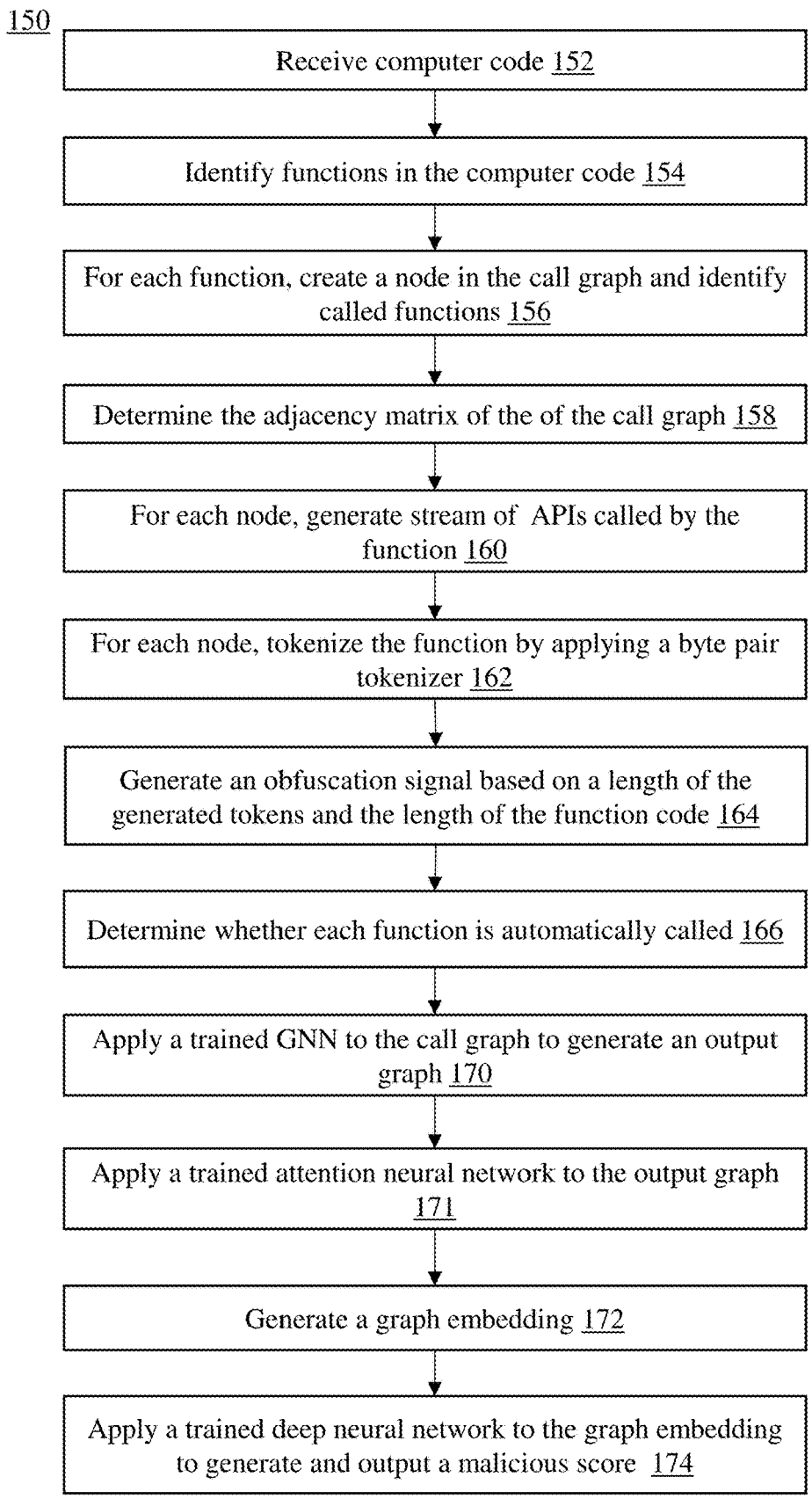
FIG. 9 is a flow diagram of an embodiment of a method implemented by processor circuitry for detecting malicious code using graph neural networks

Turning to FIG. 9, a method 150 implemented by processor circuitry 14 is shown for detecting malicious code using graph neural networks. In step 152, the processor circuitry 14 receives computer code 16. The processor circuitry 14 creates a call graph 24 from the received computer code 16. Creating the call graph is performed in steps 154, 156, and 158. In step 154, functions 18 are identified by function code 32 located in the computer code 16. In step 156, for each of the identified functions 18, a node 26 is created in the call graph 24 representing the function 18, and other functions 18 of the computer code 16 called by the function 18 are identified as called functions 34. In step 158, the adjacency matrix 28 of the call graph 24 is determined.

The result of steps 160, 162, 164, and 166, is that the processor circuitry 14 vectorizes each of the identified functions 18 to form a fixed size feature vector 30 for each of the nodes 26. In step 160, a stream of APIs 42 called by the function 18 represented by the node 26 is generated by applying a regular expression engine 44 to identify known strings 46 representing known application programming interfaces (APIs). In step 162, the function 18 represented by the node 26 is tokenized by applying a byte pair tokenizer 50 to the function code 32 of the function 18, such that tokens 52 are generated representing the function 18. In step 164, an obfuscation signal 54 is generated based on both a length of the generated tokens 56 and a length of the function code 58. In step 166, a determination is made concerning whether the function 18 is automatically called by identifying trigger(s) 60 causing execution of the function 18 and determining whether any of the identified trigger(s) is an auto-trigger based properties of the trigger 60. When one of the identified trigger(s) 60 is an auto-trigger, the function 18 is identified as automatically called.

In step 170, a trained graph neural network (GNN) 62 including an attention neural network 64 is applied to the call graph 24, such that the GNN 62 aggregates neighboring nodes 26 and generates an output graph 66. As described above, the attention neural network 64 modifies the output graph by assigning weights to nodes of the output graph. In step 171, the processor circuitry 14 applies a trained attention neural network to the generated output graph to modify the output graph by assigning weights to nodes of the output graph. In step 172, the processor circuitry 14 generates a graph embedding 80 by calculating a weighted sum of the assigned weights. In step 174, a trained deep neural network 82 is applied to the graph embedding 80 to generate and output a malicious score for the computer code 16 identifying the computer code as malicious or benign.

The processor circuitry 14 may have various implementations. For example, the processor circuitry 14 may include any suitable device, such as a processor (e.g., CPU), programmable circuit, integrated circuit, memory and I/O circuits, an application specific integrated circuit, microcontroller, complex programmable logic device, other programmable circuits, or the like. The processor circuitry 14 may be located on one or more discrete and separate pieces of hardware. The processor circuitry 14 may also include a non-transitory computer readable medium, such as random-access memory (RAM), a read-only memory (ROM), an erasable programmable read-only memory (EPROM or Flash memory), or any other suitable medium. Instructions for performing the method described below may be stored in the non-transitory computer readable medium and executed by the processor circuitry 14. The processor circuitry 14 may be communicatively coupled to the computer readable medium and communication interface through a system bus, mother board, or using any other suitable structure known in the art.

The memory 12 may be any suitable computer readable medium, such as one or more of a buffer, a flash memory, a hard drive, a removable media, a volatile memory, a non-volatile memory, a random-access memory (RAM), or other suitable device. In a typical arrangement, the memory 12 may include a non-volatile memory for long term data storage and a volatile memory that functions as system memory for the processor 16. The memory 12 may exchange data with the processor circuitry 14 over a data bus. Accompanying control lines and an address bus between the memory 12 and the processor circuitry 14 also may be present. The memory 12 is considered a non-transitory computer readable medium.

Turning to FIG. 10, a non-transitory computer readable memory 120 is shown having software 122 embodied thereon for detecting malicious code using graph neural networks. The executing of the software 122 causes the processor circuitry 14 to perform the steps described above. The executing of the software 122 may cause the processor circuitry 14 to perform the actions, operations, and method steps described above. The memory 120 may be any non-transitory computer readable medium suitable for storing software 122.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The above-described processes including portions thereof can be performed by software, hardware, and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A method implemented by processor circuitry for detecting malicious code using graph neural networks, the method comprising:
   receiving computer code;
   creating a call graph having nodes and an adjacency matrix from the received computer code comprising:
      identifying functions by function code located in the computer code, wherein each of the identified functions represents function code;
      for each of the identified functions:
         creating a node in the call graph representing the function; and
         identifying as called functions other functions of the computer code called by the function;
      determining the adjacency matrix of the call graph, wherein:
         the adjacency matrix is a matrix of elements with each of the elements representing two of the nodes of the call graph as a node pair;
         each of the elements has a weight indicating whether the two nodes of the node pair represented by the element are connected;
         the two nodes of the node pair are connected when the function represented by one of the nodes of the node pair calls the function represented by the other node of the node pair; and
         the weight of the element is based on a number of calls between the two functions represented by the two nodes;
   vectorizing each of the identified functions to form a fixed size feature vector for each of the nodes, the vectorizing comprising, for each of the nodes:
      generating a stream of APIs called by the function represented by the node by applying a regular expression engine to identify known strings representing known application programming interfaces (APIs);
      tokenizing the function represented by the node by applying a byte pair tokenizer to the function code of the function, such that tokens are generated representing the function;
      generating an obfuscation signal based on both a length of the generated tokens and a length of the function code; and
      determining whether the function is automatically called comprising:
         identifying one or more triggers causing execution of the function;
         determining whether the identified one or more triggers is an auto-trigger based properties of the trigger; and
         when one of the identified one or more triggers is an auto-trigger, identify the function as automatically called;

applying a trained graph neural network (GNN) to the call graph, such that the GNN aggregates neighboring nodes and generates an output graph; and applying a trained attention neural network to the generated output graph to modify the output graph by assigning weights to nodes of the output graph, wherein:

each of the nodes of the output graph corresponds to a node of the call graph representing a function of the computer code, such that each of the nodes of the output graph represents a function of the computer code; and the weight assigned to each of the nodes is a probability distribution based on a determined maliciousness of the function represented by the node as determined by the attention neural network;

generating a graph embedding by calculating a weighted sum of the assigned weights; and applying a trained deep neural network to the graph embedding to generate and output a malicious score for the computer code identifying the computer code as malicious or benign.

2. The method of claim 1, further comprising:

receiving training computer code, wherein the training computer code includes functions and each of the received training computer code is labeled as malicious or benign;

generating training data by:

creating from the training computer code the call graph having nodes representing the functions, and the adjacency matrix; and vectorizing each of the functions identified in the training computer code to form a fixed size feature vector for each of the nodes; and training the GNN using the generated training data, such that when the GNN is applied to computer code, the GNN outputs a malicious score for the computer code as malicious or benign.

3. The method of claim 2, further comprising supplementing the generated training data to include obfuscated malicious training data in the generated training data by:

for at least one of the received training computer code labeled as malicious, identifying the received training computer code as malicious training computer code and generating malicious training data by:

creating from the malicious training computer code the call graph having nodes representing the functions, and the adjacency matrix; and vectorizing each of the functions identified in the malicious training computer code to form a fixed size feature vector for each of the nodes;

for at least one of the received training computer code labeled as benign, identifying the received training computer code as benign training computer code and generating benign training data by:

creating from the benign training computer code the call graph having nodes representing the functions, and the adjacency matrix; and vectorizing each of the functions identified in the benign training computer code to form a fixed size feature vector for each of the nodes;

for at least one of the functions included in the benign training computer code, identifying:

the function as a benign function;

the node representing the function as a benign node; and the fixed size feature vector for the node as a benign feature vector;

generating obfuscated malicious training data by adding the benign node to the call graph of the malicious training data;

labeling the generated obfuscated malicious training data as malicious;

adding the generated obfuscated malicious training data to the generated training data.

4. The method of claim 1, wherein, for each of the identified auto-trigger functions, identifying each of the functions called by the auto-trigger as an auto-trigger function.

5. The method of claim 4, wherein at least one of:

at least one of an order of appearance or identified keywords in the generated stream of APIs is weighted as more important by the bi-directional GRU; and at least one of an order of appearance or identified keywords in the generated tokens are weighted as more important by the bi-directional GRU.

6. The method of claim 1, wherein a type of the function is determined based on a keyword included in a function name included in the code for the trigger of the function.

7. The method of claim 1, wherein at least one of:

for each function, the stream of APIs is passed to a bi-directional gated recurrent unit (GRU) and an output of the bi-directional GRU is included in the fixed size feature vector for the function; or for each function, the generated tokens representing the function are passed to a bi-directional GRU and an output of the bi-directional GRU is included in the fixed size feature vector for the function.

8. The method of claim 1, wherein the fixed size feature vector additionally includes an indication of a presence of specific features including a number of messages boxes.

9. The method of claim 1, wherein two connected nodes are connected by an edge having a weight based on a number of calls between the two functions represented by the two connected nodes.

10. The method of claim 1, wherein the malicious score output by the trained deep neural network indicates a probability of the computer code being malicious.

11. An electronic device for detecting malicious code using deep learning, the electronic device comprising:

a memory configured to store training computer code including functions and labeled as malicious or benign;

processor circuitry configured to:

generate training data by:

creating a call graph having nodes and an adjacency matrix from the stored training computer code comprising:

identifying functions by function code located in the computer code, wherein each of the identified functions represents function code;

for each of the identified functions:

creating a node in the call graph representing the function; and identifying as called functions other functions of the computer code called by the function;

determining the adjacency matrix of the call graph, wherein:

the adjacency matrix is a matrix of elements with each of the elements representing two of the nodes of the call graph as a node pair;

each of the elements has a weight indicating whether the two nodes of the node pair represented by the element are connected;

the two nodes of the node pair are connected when the function represented by one of the nodes of the node pair calls the function represented by the other node of the node pair; and the weight of the element is based on a number of calls between the two functions represented by the two nodes;

vectorizing each of the identified functions to form a fixed size feature vector for each of the nodes, the vectorizing comprising, for each of the nodes:

generating a stream of APIs called by the function represented by the node by applying a regular expression engine to identify known strings representing known application programming interfaces (APIs);

tokenizing the function represented by the node by applying a byte pair tokenizer to the function code of the function, such that tokens are generated representing the function;

generating an obfuscation signal based on both a length of the generated tokens and a length of the function code; and determining whether the function is automatically called comprising:

identifying one or more triggers causing execution of the function;

determining whether the identified one or more triggers is an auto-trigger based properties of the trigger; and when one of the identified one or more triggers is an auto-trigger, identify the function as automatically called;

train a graph neural network (GNN) using the generated training data, such that when the GNN is applied to the call graph the GNN aggregates neighboring nodes and generates an output graph;

train an attention neural network to modify the output graph by assigning weights to nodes of the output graph, wherein:

each of the nodes of the output graph corresponds to a node of the call graph representing a function of the computer code, such that each of the nodes of the output graph represents a function of the computer code; and the weight assigned to each of the nodes is a probability distribution based on a determined maliciousness of the function represented by the node as determined by the attention neural network;

generate a graph embedding by calculating a weighted sum of the assigned weights;

train a deep neural network to the graph embedding to generate and output a malicious score for the computer code identifying the computer code as malicious or benign;

receive testing computer code including functions;

create from the testing computer code the call graph having nodes representing the functions, and the adjacency matrix; and vectorize each of the functions identified in the testing computer code to form a fixed size feature vector for each of the nodes;

apply the trained GNN including the attention neural network to the call graph to generate the output graph and to assign the weights to the nodes of the output graph;

generate the graph embedding by calculating the weighted sum of the assigned weights; and apply the trained deep neural network to the graph embedding to generate and output a malicious score for the received testing computer code identifying the received testing computer code as malicious or benign.

12. The electronic device of claim 11, wherein the processor circuitry is further configured to supplement the generated training data to include obfuscated malicious training data in the generated training data by:

for at least one of the stored training computer code labeled as malicious, identifying the received training computer code as malicious training computer code and generating malicious training data by:

creating from the malicious training computer code the call graph having nodes representing the functions, and the adjacency matrix; and vectorizing each of the functions identified in the malicious training computer code to form a fixed size feature vector for each of the nodes;

for at least one of the received training computer code labeled as benign, identifying the received training computer code as benign training computer code and generating benign training data by:

creating from the benign training computer code the call graph having nodes representing the functions, and the adjacency matrix; and vectorizing each of the functions identified in the benign training computer code to form a fixed size feature vector for each of the nodes;

for at least one of the functions included in the benign training computer code, identifying:

the function as a benign function;

the node representing the function as a benign node; and the fixed size feature vector for the node as a benign feature vector;

generating obfuscated malicious training data by adding the benign node to the call graph of the malicious training data;

labeling the generated obfuscated malicious training data as malicious;

adding the generated obfuscated malicious training data to the generated training data.

13. The electronic device of claim 11, wherein the processor circuitry is further configured to:

for each of the identified auto-trigger functions, identify each of the functions called by the auto-trigger as an auto-trigger function.

14. The electronic device of any one of claim 11, wherein a type of the function is determined based on a keyword included in a function name included in the code for the trigger of the function.

15. The electronic device of any one of claim 11, wherein at least one of:

for each function, the processor circuitry is configured to pass the stream of APIs to a bi-directional gated recurrent unit (GRU) and an output of the bi-directional GRU is included in the fixed size feature vector for the function; or for each function, the processor circuitry is configured to pass the generated tokens representing the function to a bi-directional GRU and an output of the bi-directional GRU is included in the fixed size feature vector for the function.

16. The electronic device of claim 15, wherein at least one of:

at least one of an order of appearance or identified keywords in the generated stream of APIs is weighted as more important by the bi-directional GRU; and at least one of an order of appearance or identified keywords in the generated tokens are weighted as more important by the bi-directional GRU.

17. The electronic device of any one of claim 11, wherein the fixed size feature vector additionally includes an indication of a presence of specific features including a number of messages boxes.

18. The electronic device of any one of claim 11, wherein two connected nodes are connected by an edge having a weight based on a number of calls between the two functions represented by the two connected nodes.

19. The electronic device of any one of claim 11, wherein the malicious score output by the trained deep neural network indicates a probability of the computer code being malicious.

20. A non-transitory computer readable memory having software embodied thereon for detecting malicious code using graph neural networks, wherein the executing of the software causes processor circuitry to:
obtain training computer code including functions and labeled as malicious or benign;
generate training data by:
creating a call graph having nodes and an adjacency matrix from the training computer code comprising:
identifying functions by function code located in the computer code, wherein each of the identified functions represents function code;
for each of the identified functions:
creating a node in the call graph representing the function; and
identifying as called functions other functions of the computer code called by the function;
determining the adjacency matrix of the call graph, wherein:
the adjacency matrix is a matrix of elements with each of the elements representing two of the nodes of the call graph as a node pair;
each of the elements has a weight indicating whether the two nodes of the node pair represented by the element are connected;
the two nodes of the node pair are connected when the function represented by one of the nodes of the node pair calls the function represented by the other node of the node pair; and
the weight of the element is based on a number of calls between the two functions represented by the two nodes;
vectorizing each of the identified functions to form a fixed size feature vector for each of the nodes, the vectorizing comprising, for each of the nodes:
generating a stream of APIs called by the function represented by the node by applying a regular expression engine to identify known strings representing known application programming interfaces (APIs);
tokenizing the function represented by the node by applying a byte pair tokenizer to the function code of the function, such that tokens are generated representing the function;
generating an obfuscation signal based on both a length of the generated tokens and a length of the function code; and
determining whether the function is automatically called comprising:
identifying one or more triggers causing execution of the function;
determining whether the identified one or more triggers is an auto-trigger based properties of the trigger; and
when one of the identified one or more triggers is an auto-trigger, identify the function as automatically called;
train a graph neural network (GNN) using the generated training data, such that when the GNN is applied to the call graph, the GNN aggregates neighboring nodes and generates an output graph; and
train an attention neural network to modify the output graph by assigning weights to nodes of the output graph, wherein:
each of the nodes of the output graph corresponds to a node of the call graph representing a function of the computer code, such that each of the nodes of the output graph represents a function of the computer code; and
the weight assigned to each of the nodes is a probability distribution based on a determined maliciousness of the function represented by the node as determined by the attention neural network;
generate a graph embedding by calculating a weighted sum of the assigned weights; and
train a deep neural network to the graph embedding to generate and output a malicious score for the computer code identifying the computer code as malicious or benign;
receive testing computer code including functions;
create from the testing computer code the call graph having nodes representing the functions, and the adjacency matrix; and
vectorize each of the functions identified in the testing computer code to form a fixed size feature vector for each of the nodes; and
apply the trained GNN including the attention neural network to the call graph to generate the output graph and to assign the weights to the nodes of the output graph;
generate the graph embedding by calculating the weighted sum of the assigned weights; and
apply the trained deep neural network to the graph embedding to generate and output a malicious score for the received testing computer code identifying the received testing computer code as malicious or benign.

* * * * *